United States Patent [19]

Botsolas

[11] Patent Number: 4,869,293
[45] Date of Patent: Sep. 26, 1989

[54] END CAP

[76] Inventor: Chris J. Botsolas, 301 Park St. South, St. Petersburg, Fla. 33707

[21] Appl. No.: 185,114

[22] Filed: Apr. 22, 1988

[51] Int. Cl.4 .............................................. F16L 55/10
[52] U.S. Cl. .................................... 138/96 R; 138/89; 138/96 T; 138/109
[58] Field of Search ............... 138/110, 109, 148, 149, 138/178, 167, 168, 89, 96 R, DIG. 4, 96 T; 285/45, 47, 177; 137/375

[56] References Cited

U.S. PATENT DOCUMENTS

| | | | |
|---|---|---|---|
| 276,044 | 4/1883 | Holt | 138/178 |
| 518,570 | 4/1894 | Hamlin | 138/167 |
| 2,041,911 | 5/1936 | Ericson | 138/148 |
| 2,048,424 | 7/1936 | Caldwell | 285/45 |
| 2,545,030 | 3/1951 | Isenberg et al. | 138/109 |
| 2,695,254 | 1/1954 | Isenberg | 138/89 |
| 2,756,172 | 7/1956 | Kidd . | |
| 3,443,599 | 5/1969 | Klein . | |
| 3,495,629 | 2/1970 | Botsolas et al. . | |
| 3,560,287 | 2/1971 | Helling . | |
| 3,724,491 | 4/1973 | Knudsen et al. | 138/149 |
| 3,732,894 | 5/1973 | Botsolas . | |
| 3,960,181 | 6/1976 | Baur et al. . | |
| 3,995,665 | 12/1976 | Monaghan | 138/149 |
| 4,112,967 | 9/1978 | Withem | 138/149 |
| 4,139,026 | 2/1979 | Zack . | |
| 4,449,554 | 5/1984 | Busse | 137/375 X |
| 4,553,308 | 11/1985 | Botsolas . | |
| 4,605,043 | 8/1986 | Grenier | 138/149 |
| 4,627,995 | 12/1986 | Botsolas . | |
| 4,669,509 | 6/1987 | Botsolas . | |

Primary Examiner—James E. Bryant, III

[57] ABSTRACT

An end cap and a method for making and installing the same for covering terminal ends of cylindrical objects to provide protection against water and other elements.

12 Claims, 2 Drawing Sheets

END CAP

FIELD OF THE INVENTION

The present invention relates to a method of manufacture and method of installation of end caps for covering the terminal ends of cylindrical objects, such as insulated pipes and wood posts.

BACKGROUND OF THE INVENTION

Protection for piping from elements is necessary in a number of applications. More specifically, pipe insulation, when not covered and protected, is susceptable to water and insect infiltration and deterioration. Other areas that require protection include wood posts, dock posts, etc., which when not covered, get dirty, wet, and consequently deteriorate.

When applying insulation to pipes, it is desirable to cover the end portion of the insulation at unions, valves, specialty fittings and the terminal ends of pipes. Finding a satisfactory way to cover the end portion of insulation has been a persistent and long term problem in the pipe insulation industry.

Raw ends of pipe insulation have been covered in various ways including cementing and canvasing, cementing and painting with a mastic coating, or covering the insulation with a thermoformed rigid PVC end cap. Although currently in use, none of these methods are entirely satisfactory for all applications because they do not stand up under high temperatures which may be generated by pipes carrying high temperature liquids and gases, i.e. hot water, steam, etc.

In cases of cementing and canvasing over or painting with mastic coating, the canvas and mastic coating materials tend to shrink and ultimately disintegrate when exposed to high pipe temperatures, weathering, or washdowns. Accordingly, these methods are unsuitable for high temperature applications. The end result of these methods has been deterioration of the pipe insulation; rusting of the pipe itself; loss of insulation value due to intrusion of moisture; and unattractive vermin or insect shelters in the case of cold piping.

End caps made of PVC have received much attention in recent years. These PVC end caps are shaped over molds made of two sections, each greater than a half circle. The thermoformed cover, therefore, has a slightly ovoid shape. After thermoforming, the PVC end cap is cut through one side and along the centerline of the base, but not through the side opposite to the cut side thereby forming two sections which are connected solely by the side wall which has not been cut. The end cap is then placed over the terminal portion of the insulation and the above-described sections are overlapped until the cover fits securely around the insulated pipe. A PVC end cap of this type has been manufactured by Proto Corp., Clearwater, Fla., and is more fully described in the 1986 product catalog of Proto Corp., page 6.

PVC end caps, like other methods of covering pipe insulation mentioned above, are limited because they have insufficient resistance to high temperatures. More specifically, PVC has a softening point of 150° F to 165° F, which is well below the temperature of high temperature liquids and gases flowing through the pipe. This makes use of PVC end caps for higher temperature applications impractical.

In light of the limitations of the cited methods, efforts have thus been made to form end caps out of metals, especially soft metals, such as aluminum. These materials offer resistance against deterioration at much higher temperatures than PVC and similar plastics.

However, the drawback to the use of metals is their inability to be drawn in oversized half-sections, as can be done for PVC, without the use of expensive individual dies. For this reason, metal end caps have been made by forming two separate and identical half sections. The two half-sections are then fitted around the insulated pipe and fastened by rivets, screws, etc. Metal end caps of this type and methods of manufacture are described in Holt, U.S. Pat. No. 276,044. Disadvantages associated with such methods include difficulty in fitting and fastening the two half-sections over pipes of small diameters, providing watertight seals and the difficulty for one person to install the cover about the pipe.

SUMMARY OF THE INVENTION

It is an object of the present invention to provide an end cap which is easily adapted to fit around the terminal end of a pipe or other substantially cylindrical object.

It is a further object of the present invention to provide an end cap that is watertight.

It is a further object of the present invention to provide an end cap for end portions of insulation at unions, valves, and other specialty fittings.

It is a further object of the present invention to provide an end cap which is simple to manufacture.

It is a further object of the present invention to provide an end cap that can be adapted to fit a variety of cylindrical diameters.

It is a further object of the present invention to provide a method of installing an end cap.

It is another object of the present invention to provide an end cap with a conical or convex shape in order to shed wash or rain water away from the object being covered.

Still another object of this invention is to provide an end cap which can be easily installed.

These and other objects are attained hereby by an end cap which is suitable for use as a protective device adapted to be placed about a terminal end of a cylindrical object and methods of covering the object with the end cap of the present invention. The end cap includes a flat base surface, a rim at the outer edge of the base and a wall depending from the rim. A seam extends radially from the center of the base to the rim, continuing from the rim down the length of the wall to the end of said wall. Said seam creates a leading edge along one side of the seam and a trailing edge along the opposing side of the seam.

The end cap formed in accordance with the present invention is larger in diameter than the diameter of the object being covered. The end cap is cut along the seam and thus the two edges along the seam can be overlapped to fit a variety of diameter sizes of cylindrical objects. The end cap when placed about the terminal end of cylindrical objects will take on a convex or conical shape. This convex or conical shape results from the movement of the leading edge over the trailing edge.

The end cap can be used not only for termination ends of insulation and pipes but also for reducers, wherein smaller cylinders continue from larger cylinders which are then covered with end caps having appropriately sized apertures to accommodate the smaller cylinders. Still another application for this end cap includes providing a protective cover for the ends of marine wood piling (or poles) used for docks and for mooring boats.

The end cap of the present invention can be made of any malleable material capable of withstanding the temperature requirements of the cylindrical object which it covers and is substantially waterproof and vaporproof. Preferred materials for the end cap include malleable sheet metal such as aluminum, stainless steel, painted or plain iron, or galvanized iron and plastics such as polyvinyl chloride. The thickness of the materials can be between about 0.005″ to 0.125″.

DESCRIPTION OF THE DRAWINGS

The following drawings, in which the like reference characters indicate like parts, are illustrative of embodiments of the invention and are not intended to limit the scope of the invention as encompassed by the claims forming a part of this application.

DESCRIPTION OF THE PREFERRED EMBODIMENT

For purposes of this Specification, the term "cylindrical object" as used herein includes a pipe, pipe insulation, wood post or any other substantially cylindrical shaped object.

Figure 1:
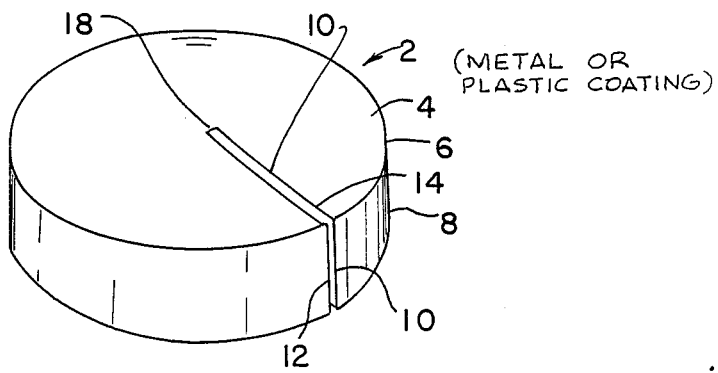
FIG. 1 is a perspective view of an end cap in accordance with the present invention.

The present invention is suitable for use where terminal ends of cylindrical objects, or end portions of insulation, require a protective covering. FIG. 1 shows an end cap (2) comprised of a flat base surface, (4) a rim (6) at the outside edge of the flat base surface (4), a wall (8) depending from the rim at the outside edge of the flat base surface (4) and a substantially linear and continuous seam (10) extending radially from the center (18) of the flat base surface (4) to the rim (6) and continuing from the rim (6) of the flat base surface (4) down the length of the wall (8). The seam (10) has two opposing edges: a leading edge (12) and a trailing edge (14). The seam (10) provides a means for overlapping the leading edge (12) and trailing edge (14).

Figure 2:
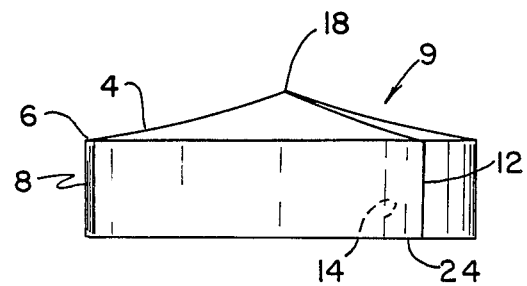
FIG. 2 is an elevational view of an end cap of the present invention wherein the end cap is in a closed position with its opposed sections in an overlapping relationship.

FIG. 2 illustrates the end cap (2) of the present invention wherein the leading edge (12) has been urged over the trailing edge (14) so that both edges create an overlap seam (24). The urging of said leading edge (12) over the trailing edge (14) upsets the flat base surface (4) into a conical shape (9).

Alternatively, the end cap (2) can be used at a reduced section in a piping system. Therein, as seen in FIG. 3, the end cap (2) is depicted with the flat base surface (4) having a centrally disposed aperture (16) to accommodate an additional smaller or reduced cylinder (30) that continues from the end cap (2).

Figure 3:
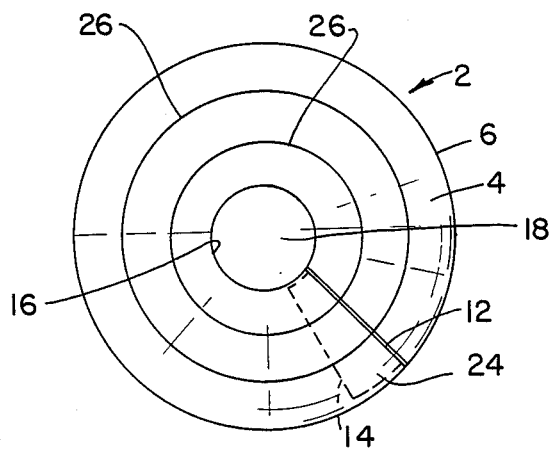
FIG. 3 is a top plan view of an end cap of the present invention with an aperture and embossed circular markings in the flat base surface adopted for use with a reduced pipe extending therefrom.

The structural configuration of the end cap (2) of FIG. 3 is effected by providing the center (18) of the flat base surface (4) with an aperture (16) to correspond to the size of a reduced cylindrical object extending from the end cap (2). The flat base surface (4) of the end cap (2) of FIG. 3 has embossed concentric circular markings or score lines (26) adapted to facilitate and ensure the accurate cutting of an aperture (16) in the flat base surface (4). The end cap (2) is embossed with a variety of circular markings or score lines (26) to adapt to a variety of diameters and to facilitate removing portions of the flat base surface (4) to form the aperture (16). The aperture (16) can be formed by pushing out the center (18) of the flat base surface (4), by cutting a circular hole with snips, by stripping out by hand, or by any other method known in the art. As also shown in FIG. 3, the leading edge (12) of the end cap (2), when urged over the trailing edge (14), creates an overlap seam (24). The end cap (2) can fit various size diameters by decreasing or enlarging the size overlap seam (24).

Figure 4:
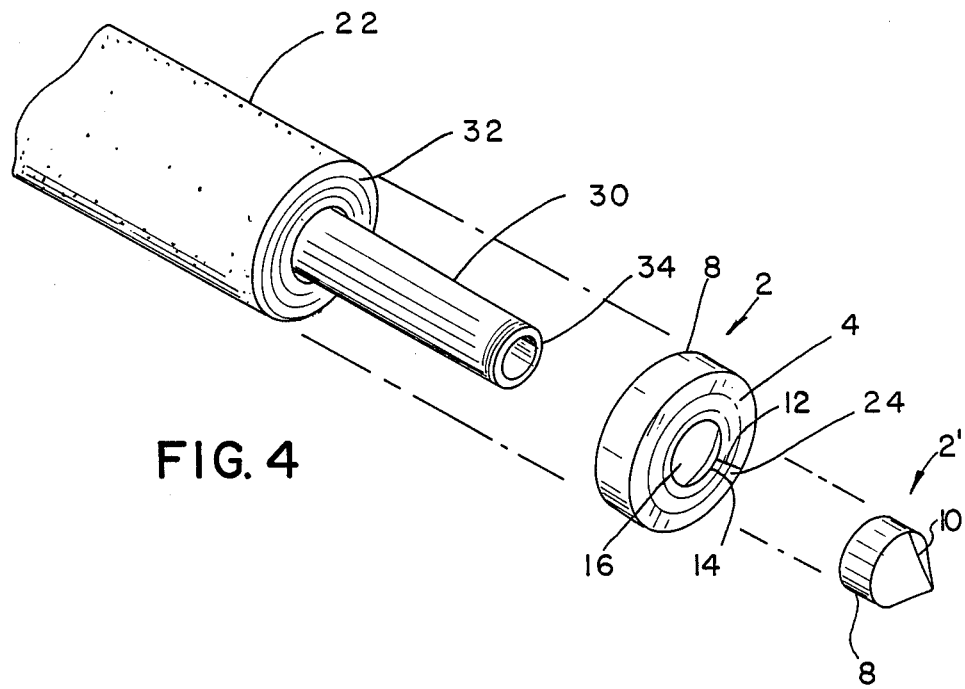
FIG. 4 is an exploded perspective view of the end cap of FIG. 3 for installation over the terminal end of a larger insulated pipe and the end cap of FIG. 2 for installation over a reduced pipe extending therefrom.
Figure 5:
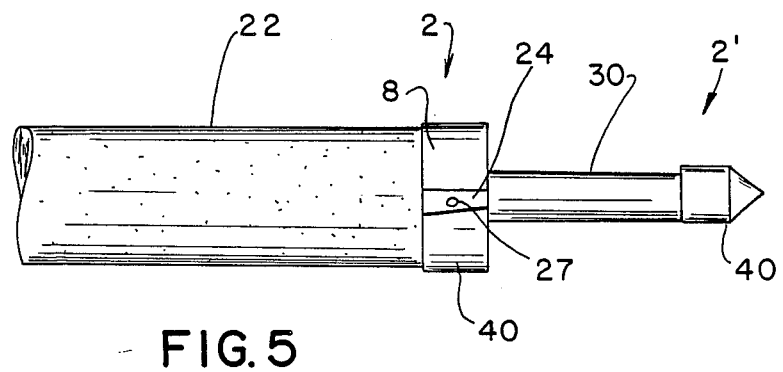
FIG. 5 is a side elevational view of the end cap of FIG. 3 installed about the terminal end of a larger insulated pipe and the end cap of FIG. 2 installed about the terminal end of a reduced pipe.

FIGS. 4 and 5 show an application for covering both a reducer transition section (32) and the terminal end (34) of a piping system. An end cap (2′) of FIG. 2 is installed over a terminal end (34) of a reduced bared pipe (30) and an end cap (2) as depicted in FIG. 3 is placed over a transition section (32). The end cap (2) that is installed over a larger insulated pipe (22) requires spreading the seam (10) into an oblique angle, and urging leading edge (12) of the end cap (2) over the trailing edge (14) creating overlap seam (24) sized to fit the diameter of the insulated pipe (22). The diameter of the outgoing pipe (30) extending through the aperture (16) in the end cap (2) determines the size of the aperture (16) in the flat base surface (4). The size of the aperture (16) must be calculated for applications in which the end cap (2) is compressed to a final outer diameter that will fit a larger cylinder (22).

The size of an end cap (2) is determined by calculating the circumference of the outer diameter of the cap (2), adding the amount of the overlap seam (24) to the circumference, and dividing that sum by pi (3.14). This will give the die required to make the proper outer diameter of the end cap (2).

By way of example, assuming a 4½″ pipe diameter and an overlap of ¾″: circumference=4.5″×3.14″=14.13+0.75″=14.88″ 3.14=4.740″ - desired outer diameter of the end cap.

Once the end cap (2) is formed with the proper outer diameter, the diameter of the aperture (16) can be determined to fit the outgoing pipe (30) projecting from the end cap (2). This is done by determining the value of the following ratio:

$$\frac{\text{circumference of the outer diameter} + \text{overlap}}{\text{outer diameter}}$$

and then dividing the ratio by pi (3.14) to calculate the desired aperture diameter. Building on the above example and further assuming a desired final aperture of 1″:

$$\frac{14.13'' + .75''}{4.5''} = 3.31'' \; 3.14 = 1.050'' \text{ aperture}$$

in the end cap (2) to result in the finished aperture of 1" plus the overlap. Due to variations in manufacturing tolerances, and allowance for the conical shape of the end cap (2), the aperture (16) should be made about 1/16" larger than calculated.

Once the leading edge (12) is urged over the trailing edge (14) to form an overlap seam (24) sufficient to fit the cylindrical object to be capped, the end cap (2) is fastened to the cylindrical object through a means of attachment. The means for attachment may comprise any suitable means but adhesive tapes (40) placed around wall (8) of the end cap (2) as seen in FIG. 5 or screws or rivets (27) placed through the overlap seam (24) are preferred.

If a watertight or vaportight environment is required, the attached end cap (2) can be sealed by a means (not shown) for sealing, including caulking, etc., along the seam (10) and about the perimeter of the wall (8) contacting the cylindrical object being capped as seen in FIG. 1. A suitable means for sealing is a silicone caulking adhesive, acrylic caulking, butyl rubber additive, or combinations thereof or vinyl tapes.

End caps (2) made of metal can be coated with epoxy, acrylic, Teflon, vinyl, polyurethane, polypropylene or any other suitable coatings before and after installation in corrosive atmospheric environments.

The end cap (2) can be manufactured by any number of known methods in the industry: pressing, drawing, metal spinning or hydroforming methods. When using plastics that have been provided with impact strength, end caps can be formed cold, in the same press as used for metals.

Many variations will suggest themselves to those skilled in the art in light of the above detailed description. All such obvious variations are within the full scope of the appended claims.

I claim:

1. An end cap for covering the terminal ends of a cylindrical object having a circular cross section smaller than the end cap comprised of of a circular base surface, said base having a first flat configuration, a rim at the outside edge of the flat base surface, a wall depending from the rim at the outside edge of the base surface, said base surface rim and wall being integrally formed of malleable material 0.005" to 0.125" thick, a substantially linear continuous seam extending radially from the center of the base surface to the rim, down the length of the wall, said seam bounded by a leading edge along one side of the seam and a trailing edge along the other side of the seam, opposite the leading edge, said end cap thereby being adapted to be compressed about the cylindrical object to be covered, means to allow the leading edge to be urged beyond the trailing edge create an overlap seam which reduces the diameter of the wall and upsets the first flat configuration of the base surface into a second conical shape.

2. An end cap according to claim 1 wherein the flat base surface further comprises an aperture to accommodate a cylindrical object.

3. An end cap according to claim 2 wherein the flat base surface is comprised of concentric circular markings of different radii about the center of the flat base surface to correspond to different diameters of cylindrical objects.

4. An end cap according to claim 3 wherein said markings comprise embossed grooves adapted to facilitate accurate cutting along said grooves to form an aperture in the flat base surface.

5. An end cap according to claim 1 wherein said malleable sheet metal is selected from the group consisting of aluminum, stainless steel, painted or plain iron and galvanized iron.

6. An end cap according to claim 1 further comprising a means for securing the overlap seam to a cylindrical object.

7. An end cap according to claim 6 wherein the means for securing said overlap seam is selected from the group consisting of adhesive, tapes, screws, pop rivets and combinations thereof placed through or over the overlap seam.

8. An end cap according to claim 1 further comprising a means for sealing the end cap to a cylindrical object.

9. An end cap according to claim 8 wherein the means for sealing the end cap comprises a material selected from the group comprising silicone caulking adhesive, acrylic caulking, butyl rubber additives, composites of these, and vinyl tapes.

10. An end cap according to claim 5 further comprising a coating of a material selected from the group consisting of epoxy, acrylic, Teflon, vinyl, polyurethane and polypropylene.

11. An end cap according to claim 1 wherein the material of the end cap is plastic.

12. An end cap according to claim 9 wherein the material of the end cap is polyvinyl chloride.

* * * * *